May 10, 1927. 1,628,202
O. F. SHEPARD
ELECTRIC BRAKE
Filed Jan. 15, 1924 2 Sheets-Sheet 1
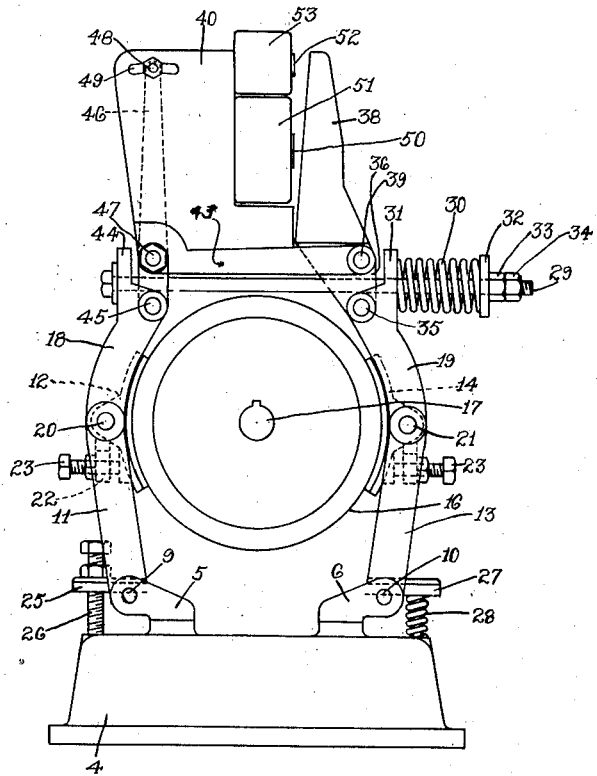
Fig.1.
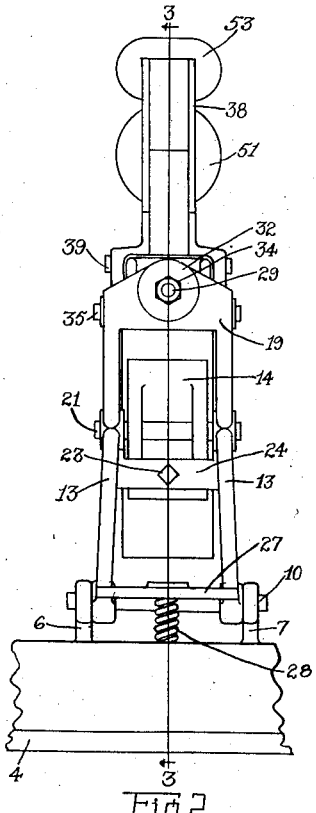
Fig.2.
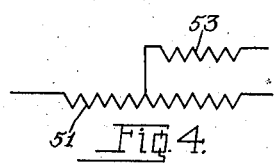
Fig.4.
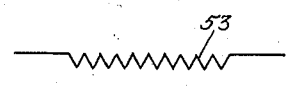
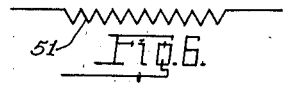
Fig.6.
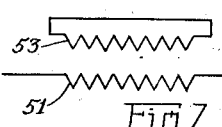
Fig.5.
Fig.7.
Inventor
OSCAR F. SHEPARD.
By Murray & Gugelter
Attorneys May 10, 1927.
O. F. SHEPARD
1,628,202
ELECTRIC BRAKE
Filed Jan. 15, 1924    2 Sheets-Sheet 2
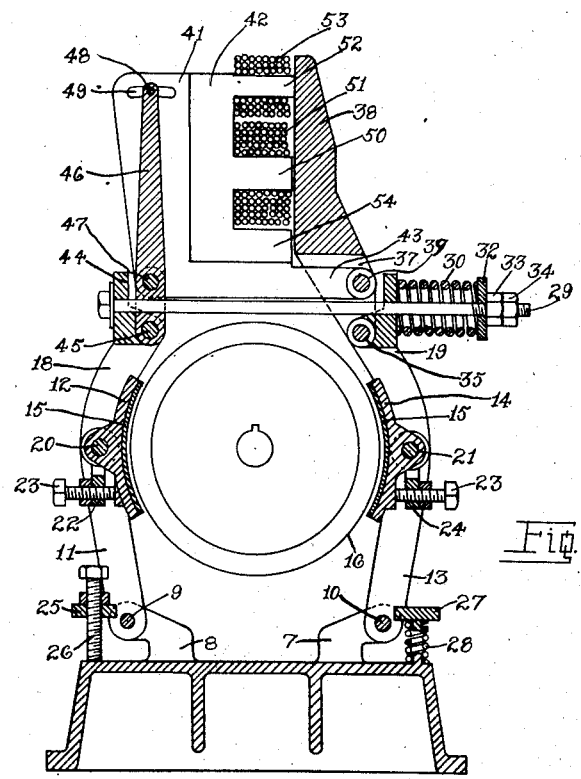
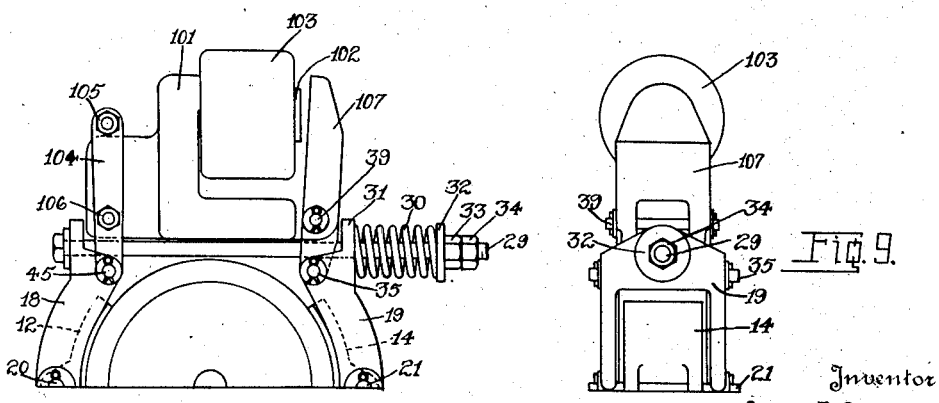
Inventor
OSCAR F. SHEPARD
By Murray & Burgelter
Attorneys Patented May 10, 1927.

1,628,202

UNITED STATES PATENT OFFICE.

OSCAR F. SHEPARD, OF CINCINNATI, OHIO.

ELECTRIC BRAKE.

Application filed January 15, 1924. Serial No. 686,431.

An object of my invention is to provide an electrically controlled brake wherein when employing alternating current, there is eliminated the hum common to brakes of this type.

Another object is to provide a device of the class described that will work efficiently on two or three phase circuits.

Another object is to provide a simple and efficient device for the purposes stated.

These and other objects are attained by the means described herein and disclosed in the accompanying drawings in which:

Fig. 1 is a side elevation of an electric brake embodying my invention.

Fig. 2 is an end elevation of the device shown in Fig. 1.

Fig. 3 is a section view on line 3—3 of Fig. 2.

Figs. 4, 5, 6 and 7 show various methods in which the coils of the electro magnets forming details of my invention, may be wired.

Fig. 8 is a fragmental front elevation of a device embodying my invention, arranged for use with direct current.

Fig. 9 is a side elevation of the structure shown in Fig. 8.

The device of my invention comprises a base 4 having upwardly extending lugs 5, 6, 7, and 8. The lugs 5 and 8 support a shaft 9 and lugs 6 and 7 support a shaft 10. The shaft 9 has pivotally mounted upon it the lower ends of arms or branches 11 of a yoke-like bracket 18. The shaft 10 has pivotally mounted upon it the lower ends of arm 13 of a second yokelike bracket 19. The arms 11 carry a transversely extending shaft 20 upon which is pivotally mounted a brake shoe 12. The arms 13 carry transversely extending shaft 21 upon which is pivotally mounted a brake shoe 14. The brake shoes are fitted with suitable brake linings 15. The brake shoes are arranged to operate upon a brake drum 16 carried by the shaft 17. A transversely extending bar 22 is carried between arms 11 and an adjustment screw 23 extends through the cross bar 22 and engages one end of the brake shoe 12 for adjustment thereof. A similar adjustment screw 23 extending through the cross bar 24 extending between arms 13, is provided for adjusting brake shoe 14. A second transversely extending bar 25 carried by arms 11 carries an adjustment screw 26 for engagement upon the base 4 whereby to adjust or limit the movement of the arms 11 outwardly about the shaft 9. A second cross bar 27 carried by arms 13 serves as an abutment means for one end of the spring 28 extending between the base 4 and cross bar 27 and serves to yieldingly resist movement of the arms 13 outwardly about the shaft 10. The bodies of the yokes each have formed in them bores through which a bolt 29 extends. A spring 30 is mounted on the bolt 29 exteriorly of the body 31 of the yoke 19. The opposite ends of the spring 30 abut the body 31 and a washer 32 carried by the bolt 29. Suitable means such as the adjustment nut 33 and a lock nut 34 are provided for relative adjustment of the bolt, frame and the yokes. The yoke 19 carries near its upper end a transversely extending shaft 35 upon which are mounted the lower ends of the downwardly extending branches 36 and 37 of an armature 38. The pin 39 carried by the branches 36 and 37 extends through plates 40 and 41 mounted upon opposite sides of laminations 42 and serving to secure the laminations in engagement upon one another, in any manner common in the art. In order to effect the said connection of the plates upon the armature the plates are provided with extensions 43. The body 44 of the yoke 18 is provided with a transversely extending shaft 45 upon which is pivotally mounted a lever or adjustment arm 46 disposed between the plates 40 and 41 and terminating adjacent the upper ends of said plates. The lever 46 is connected to plates 40 and 41 by a pin 47 passing through the lever 46 intermediate the ends of said lever. The upper or free end of the lever 46 carries an adjustment clamp bolt 48 that extends through elongated slots 49 formed in the plates 40 and 41. The laminations 42 are substantially of a form similar to the letter E. The center extensions 50 of the laminations collectively constitute an arm that serves as a core about which is provided a winding or coil 51 and the upper extensions 52 of said laminations collectively constitute an arm that serves as a core for winding or coil 53. The upper core comprising extensions 52 projects sufficiently beyond the coils that when the armature 38 has reached its limit of movement toward said coils, the armature may engage this core. The coils 51 and 53 may be wound or connected as shown in Figs. 4, 5 and 6 with substantially like effect.

When embodying my invention in devices intended for use with direct current, the frame 101 shown in Figs. 8 and 9 is employed in lieu of the plates 40 and 41, the frame carrying a core 102 of an electro magnet 103, and being mounted upon bracket 18 by means of shaft 45, pin 106 and adjusting arms 104 corresponding to lever 46. Clamping bolts 105 and 106 serve to clamp the arms and frame 101 in adjusted positions. The armature 104 is mounted in relation to the electro magnet 103, bracket 19 and bolt 29 as is the armature 38, shown in the alternating current device, mounted relatively to said bracket and bolt.

In the operation of my device the spring 30 normally operates upon the yokes for retaining the brake shoes in braking engagement upon the drum 16. Normally the electromagnets are not energized. When the electro magnets are energized the armature is drawn toward the electro magnet and serves to expand or separate the yokes against the yielding resistance of the spring 30. This action serves to release the drum from the braking action of the brake shoes. It will be noted that in the alternating current device the coil 51 and its core 50 when transformed into an electro magnet serves to do the major portion of the work in releasing the brake shoes and that after the armature has been drawn to the laminations that the core 52 together with its winding 53 serves the joint function of augmenting the action of electro magnet core 50 and of retaining or holding the armature in position. The tension of the spring 30 may be adjusted by means of adjustment nuts and lock nuts whereby to modify the action of the brake shoes on the brake drum. The set screws 23 permit adjustment of the brake shoes for bringing the bearing surface of said shoes into concentric relationship with the drum for attaining the most efficient co-operation of the brake shoes and drum. Wear upon the brake shoes may be taken up by adjustment of the adjustment arms or levers. Adjustment screw 26 and reaction spring 28 serves to position both shoes for attaining equal clearance when the brake is released.

What I claim is—

1. In a device of the class described the combination with a brake drum of brake shoes for engagement with the drum, a pivotally mounted armature controlling the brake shoes and a plurality of electro magnets operative on said armature, the electro magnets being aligned prependicular to the axis of the pivotal mounting of the armature and arranged for jointly controlling said armature.

2. In a device of the class described the combination of a two core electro magnet, a pivotally mounted armature under the influence of the electro magnet and the two cores of the electro magnet being aligned perpendicular to the axis of the pivotal mounting of the armature, the armature being arranged for contact with said magnet, a brake drum, brake shoes, means yieldingly retaining the shoes in braking engagement upon the drum, the electro magnet being adapted to move the armature upon its mounting for actuating the brake shoes against the influence of the yielding means for releasing the drum.

3. In a device of the class described the combination of a base, a pair of yokes pivotally mounted on the base, a bolt connecting the yokes remote from the base, means for limiting separation of the yokes comprising a stop limiting movement of one yoke and a spring yieldingly limiting movement of the second yoke, a brake drum extending between the yokes, the base and the bolt, brake shoes on the yokes for engagement on the drum, yielding means for retaining the shoes in braking engagement on the drum, an armature for operation against the resistance of the yielding means for releasing the drum from the shoes, and an electro magnet for operation on the armature for releasing the brake drum.

4. An electro magnetic brake for operation on alternating current comprising a substantially E shape magnet core, coils mounted on the upper two arms of said core, a base, a pair of yokes each having an end pivotally mounted on the base, the core having a pivotal mounting on a second end of one of said yokes, an armature having a pivotal mounting on a second end of the other of said yokes, the armature being arranged for co-operation with the electro magnet and having a second pivotal mounting fixed in relation to said core, a bolt and a spring carried by the bolt supported by the second mentioned ends of the yokes for yieldingly spacing the armature and the core and for yieldingly resisting separation of the second mentioned ends of the yokes.

5. In an electro magnetic brake for operation on alternating current, the combination of a magnet core of substantially an E shape, coils mounted on the upper two arms of the core, side plates for the core having extensions formed thereon, a base, a pair of yokes each having an end pivotally mounted on the base, brake shoes carried by the yokes, a lever having an end pivotally mounted on a second end of one of the yokes, the lever having a second pivotal mounting intermediate its ends, said second mounting being upon the plates, means for adjustably fixing the lever in relation to the plates, an armature having its one end pivotally mounted upon a second end of the second yoke and having a second pivotal mounting upon the extensions on the plates, said second pivotal mounting of the armature being intermediate the ends thereof, and a connection for the second mentioned ends of the yokes yieldingly resisting separation of the second mentioned ends of the yokes and yieldingly spacing the armature from the core, the armature and the core arms bearing a relation such that the core may contact the armature when the electromagnet is energized.

6. In an electromagnetic brake for operation on alternating current, the combination of a magnet core of substantially an E shape, coils mounted on the upper two arms of the core, side plates for the core having extensions formed thereon, a base, a pair of yokes each having an end pivotally mounted on the base, brake shoes carried by the yokes, a lever having an end pivotally mounted on a second end of one of the yokes, the lever having a second pivotal mounting intermediate its ends, said second mounting being upon the plates, means for adjustably fixing the lever in relation to the plates, an armature having its one end pivotally mounted upon a second end of the second yoke and having a second pivotal mounting upon the extensions on the plates, said second pivotal mounting of the armature being intermediate the ends thereof, and a connection for the second mentioned ends of the yokes yieldingly resisting separation of the second mentioned ends of the yokes and yieldingly spacing the armature from the core, the armature and the core arms bearing a relation such that the core may contact the armature when the electromagnet is energized, means for establishing a fixed limit of movement of one yoke away from the second yoke, and means for yieldingly resisting movement of the second yoke away from the first yoke.

7. In an electro magnetic brake for operation on alternating current, the combination of a magnet core of substantially an E shape, coils mounted on the upper two arms of the core, side plates for the core having extensions formed thereon, a base, a pair of yokes each having an end pivotally mounted on the base, brake shoes carried by the yokes, a lever having an end pivotally mounted on a second end of one of the yokes, the lever having a second pivotal mounting intermediate its ends, said second mounting being upon the plates, means for adjustably fixing the lever in relation to the plates, an armature having its one end pivotally mounted upon a second end of the second yoke and having a second pivotal mounting upon the extensions on the plates, said second pivotal mounting of the armature being intermediate the ends thereof, and a connection for the second mentioned ends of the yokes yieldingly resisting separation of the second mentioned ends of the yokes and yieldingly spacing the armature from the core, the armature and the core arms bearing a relation such that the core may contact the armature when the electromagnet is energized, a brake drum between the brake shoes, and means for adjusting the brake shoes.

8. In a device of the class described the combination of a base, a pair of brackets each hinged at one end on the base, a brake drum extending between the brackets, brake shoes carried by the brackets for engaging the drum, means operable at the second ends of the brackets for yieldingly retaining the shoes in engagement upon the drum, and an electromagnet and armature carried by the last mentioned ends of the brackets for operation against the yielding means for releasing the drum from the brakes, the electromagnet and the armature each having a pivotal mounting on one of the brackets and the armature having also a pivotal mounting on the electromagnet.

9. In a device of the class described the combination of a two core electromagnet, a pivotally mounted armature under the influence of the electromagnet, the armature being arranged for contact with said magnet and the two cores of the electromagnet being aligned perpendicular to the axis of the pivotal mounting of the armature, a brake drum, brake shoes, means yieldingly retaining the shoes in braking engagement upon the drum, the electromagnet being adapted to move the armature upon its mounting for actuating the brake shoes against the influence of the yielding means for releasing the drum, the cores of the electromagnet being positioned in such relation to the armature that the armature may contact but one of said cores and be disposed immediately adjacent the second of said cores.

10. In an electric brake the combination of a base, a pair of yokes each having an end pivotally mounted on the base, a brake shoe carried by each yoke, a revoluble drum between the brake shoes and with which the shoes are adapted to contact, a bolt and spring connecting the second ends of each of the yokes for holding the shoes in frictional contact with the drum, an electromagnet having a pivotal mounting on one yoke, an armature having a pivotal mounting on the second yoke and a second pivotal mounting on the electromagnet, the relative movement of the armature and electromagnet upon their pivotal mountings on the yokes and the movement of the armature about its pivotal mounting on the electromagnet serving to move the yokes about their pivotal mountings on the base for moving the brake shoes to and from frictional contact upon the drum.

11. In an electric brake the combination of a base, a pair of yokes each having an end pivotally mounted on the base, a brake shoe carried by each yoke, a revoluble drum between the brake shoes and with which the shoes are adapted to contact, a bolt and spring connecting the second ends of each of the yokes for holding the shoes in frictional contact with the drum, an electromagnet having a pivotal mounting on one yoke, an armature having a pivotal mounting on the second yoke and a second pivotal mounting on the electro magnet, the relative movement of the armature and electro magnet upon their pivotal mountings on the yokes and the movement of the armature about its pivotal mounting on the electro magnet serving to move the yokes about their pivotal mountings on the base for moving the brake shoes to and from frictional contact upon the drum, a stop for limiting movement of one of the yokes about its pivotal mounting on the base and a spring operative between the other yoke and the base yieldingly resisting movement of said other yoke about its pivotal mounting on the base.

12. In an electrical brake the combination of a base, a pair of yokes each having an end pivotally mounted on the base, brake shoes carried by the yokes, a revoluble drum between the shoes for frictional contact with the shoes, a bolt and spring operative on the second ends of the yokes for yieldingly retaining the shoes in contact with the drum, an electro magnet core, a lever carried by the core and having an end pivotally mounted on one of the yokes at the said second end of said yoke, and an armature responsive to the electro magnet and having a pivotal mounting on the magnet core and a second pivotal mounting on the said second end of the other of the yokes.

13. In an electrical brake the combination of a base, a pair of yokes each having an end pivotally mounted on the base, brake shoes carried by the yokes, a revoluble drum between the shoes for frictional contact with the shoes, a bolt and spring operative on the second ends of the yokes for yieldingly retaining the shoes in contact with the drum, an electro magnet core, a lever carried by the core and having an end pivotally mounted on one of the yokes at the said second end of said yoke, an armature responsive to the electro magnet and having a pivotal mounting on the magnet core and a second pivotal mounting on the said second end of the other of the yokes, a stop for limiting movement of one of the yokes about its pivotal mounting on the base, and a spring operative between the other yoke and the base yieldingly resisting movement of the said other yoke about its pivotal mounting on the base.

In testimony whereof, I have hereunto subscribed my name this 7th day of January, 1924.

OSCAR F. SHEPARD.